Sept. 22, 1942.       T. A. BOWERS       2,296,334
RESILIENT PISTON RING
Filed Jan. 8, 1942
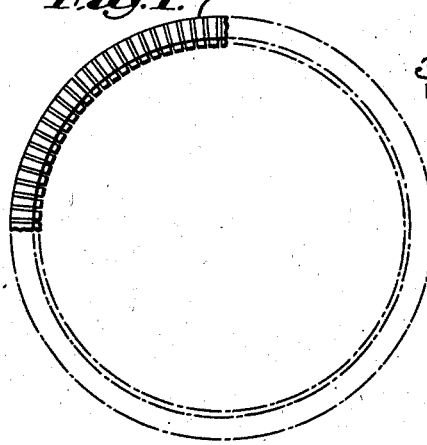
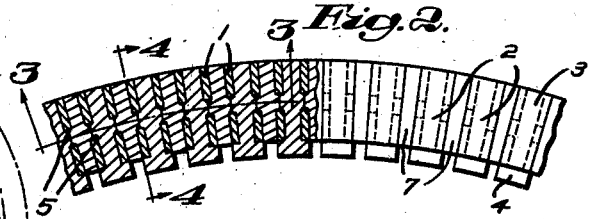
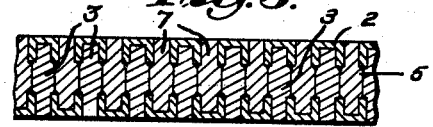
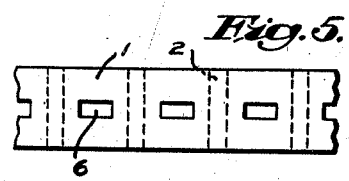
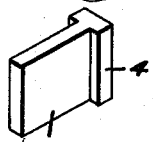
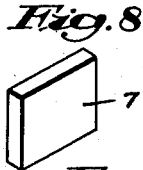
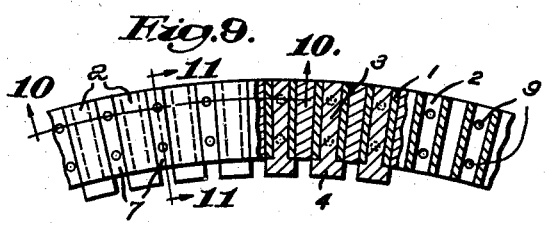
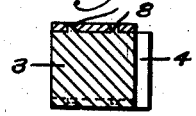
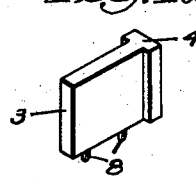
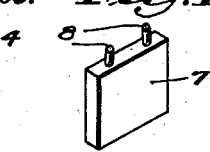
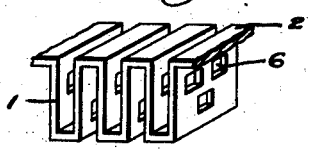
Inventor:
Thomas A. Bowers
Attorney Patented Sept. 22, 1942

2,296,334

UNITED STATES PATENT OFFICE 2,296,334

RESILIENT PISTON RING

Thomas A. Bowers, Mattapoisett, Mass., assignor to Power Research Corporation, Boston, Mass., a corporation of Massachusetts Application January 8, 1942, Serial No. 425,981

7 Claims. (Cl. 309—44)

This invention relates to piston rings and more especially to piston rings of the type which are circumferentially extensible and contractible when the ends thereof are held in abutment.

A principal object of the invention is to provide an improved piston ring and to devise a ring of the flexible type which includes a plurality of separate sealing elements, secured in the ring for the purpose of overcoming passage of fluids radially through the ring. The invention also aims to provide a simple, cheap and efficient piston ring.

The nature of the invention and its objects will be more fully understood from the following description of the drawing and discussion relating thereto.

In the accompanying drawing:

Fig. 1 is a plan view of a piston ring of the invention;

Fig. 2 is an enlarged framgentary plan view and cross section of a ring similar to that shown in Fig. 1;

Fig. 3 is another fragmentary enlarged cross section of the ring;

Fig. 4 is another enlarged fragmentary cross section of the ring;

Figs. 5 and 6 are plan and perspective views respectively, illustrating steps in the method of making the ring of the invention;

Figs. 7 and 8 are enlarged perspective views of the sealing elements of the ring;

Figs. 9, 10 and 11 illustrate a modification of piston ring;

Figs. 12 and 13 are perspective views illustrating modifications of sealing elements of the piston ring; and Figs. 14 and 15 illustrate still another modification of piston ring.

Referring more in detail to the drawing, the letter R denotes a piston ring made up of a plurality of circumferentially spaced-apart walls 1 and connecting portions 2. The connecting portions 2 are preferably flattened off in the manner illustrated in Fig. 6 and occur in an alternately disposed manner to constitute upper and lower sides of the ring.

The ring R is of the split type and normally operates with its ends in abutting relation. The spaced-apart walls 1 and connecting portions 2 are of resilient character which enables the ring to expand and contract in a circumferential direction and thus develop uniform wall pressure for engaging the ring against cylinder walls of irregular contour, such as for example "tapered" or "out-of-round" cylinders.

Mounted between the walls 1 is a plurality of sealing elements 3 which may conveniently be of a T-shaped cross section. The leg portions of the T-shaped sealing elements extend radially between the inner and outer peripheries of the ring (Fig. 2), and substantially fill the space therebetween. The heads 4 of the T-shaped sealing elements 3 extend across and overlie the inner peripheral edges of the walls 1.

Along their central portions, the T-shaped elements 3 are formed with circumferentially extending projections 5. These projections 5 engage with the walls 1 in openings 6 of some convenient shape such as that illustrated in Figs. 4 and 6, thereby solidly securing the sealing elements in position between the walls at all times.

An important aspect of the invention consists in the assembly of sealing elements between the walls 1 so that they are held in substantially sealed relation with respect to the inner edges of the ring. By attaching the T-shaped sealing elements in the manner described, the head portions 4 are adapted to overlie inner peripheral edges and prevent passage of gases therebetween. It should be observed that this sealing action is obtained without appreciably affecting the ability of the walls to move in directions circumferentially of the ring and thereby to provide flexibility.

The combination of openings 6 in the walls 1 and circumferentially extending projections 5 on the sealing elements 3 for engaging therein, provides a substantially solid ring assembly, presenting smooth sealing surfaces at the upper, lower and outer, peripheral edges of the ring. The head portions 4 of the T-shaped sealing elements are located in and are adapted to close the opening between the walls at one side of the ring.

At the same time, the head portions 4 occur in spaced-apart relation with respect to one another so that as the ring flexes, these head portions may move slightly with respect to inner peripheral edges of the walls without interfering with one another or with movement of the walls.

The structure thus provided substantially prevents passage of fluid bodies such as combination gases from the inner periphery of the ring through to the outer periphery thereof at the under side thereof, as viewed in Fig. 6. This is an advantage in utilizing the piston ring as a sealing ring for preventing combustion gas from passing downwardly from the head of a cylinder.

It is further pointed out that the circumferentially extending projections 5 perform the function of locking the sealing elements in the ring without affecting the normal tendency of the walls to move together and apart during operation of the ring in a cylinder. This is important in preserving the flexible character of rings of the type described. The sealing elements, in addition to preventing passage of fluids radially through the ring, also act as bodying agents for providing greater stability, weight, and wearing character to the ring.

In making the ring, a preferred procedure consists in utilizing a strip of resilient piston ring material such as steel. Other suitable materials as alloys and the like may be resorted to. The strip of piston ring material may be reversely folded upon itself, and may be formed into an annular body in some suitable manner as for example by securing a strip of the reversely folded material in a tapered cylinder with the ends of the reversely folded strip in abutting relation. Thereafter, passing the reversely folded strip through the relatively smaller circumference of the cylinder contracts the ring to a suitable size.

The sealing elements 3 may be inserted after a strip has been folded into a position such as that illustrated in Fig. 6, or the sealing elements may be secured to an unfolded strip such as is shown in Fig. 5. In the event that the sealing elements are inserted in the ring after it has been folded upon itself, the radially extending projections 5 may be obtained by passing the ring through a tapered die, in the manner noted above, and utilizing sufficient pressure to cause the metal in the sealing elements to flow slightly into the openings 6.

If desired, sealing elements 7 may be utilized, consisting of blocks 7 which are not of the T-shaped cross section shown in Figs. 1–7 inclusive. Fig. 8 illustrates this type of sealing element.

Various other changes may be resorted to, such as for example those incorporated in the ring illustrated in Figs. 9–13 inclusive, in which sealing elements 3 of T-shaped cross section are secured between the walls 1 by means of pin portions 8 which engage in openings 9 in the crowns or connecting portions 2 of the ring. The pins 8 may also be utilized with a sealing element of rectangular section, such as that illustrated in Fig. 13.

Still other changes and modifications may be resorted to. For example, in Fig. 14 I have illustrated a plurality of openings 6 into which radially projecting portions of sealing elements may be engaged. In Fig. 15 I have illustrated a ring having depressions 9, in which projections 10 of sealing elements 3 may engage in the same fashion as illustrated in connection with the openings of Figs. 4 and 14. Still other changes and modifications may be resorted to.

It will be seen that I have provided a flexible piston ring which includes sealing means for preventing passage of fluids radially through the ring, and into the space below the ring and between a cylinder and piston in which the ring is mounted. Means have also been included for holding the sealing elements in substantially fixed relation with respect to the ring without appreciably modifying the ability of the walls to move with respect to one another and develop flexibility. The ring of the invention is further characterized by being simple, cheap, durable and efficient.

While I have shown a preferred embodiment of the invention, it should be understood that various changes and modifications may be resorted to, in keeping with the spirit of the invention as outlined by the appended claims.

I claim:

1. As an article of manufacture a piston ring comprising a plurality of axially extending spaced-apart walls, connecting portions for connecting the walls at upper and lower sides of the ring, a plurality of sealing elements mounted between the said walls, means for securing the sealing elements thereby to prevent displacement of the sealing elements in a direction radially outward, said means consisting of shouldered portions formed along one edge of the sealing elements and adapted to extend across and overlap the inner peripheral edges of the said walls throughout their axial height.

2. As an article of manufacture a piston ring comprising a plurality of circumferentially spaced-apart walls, connecting portions for the walls, sealing elements mounted in the spaces between the walls and said sealing elements presenting shouldered portions adapted to extend across and overlie adjacent walls throughout their axial height for the purpose of preventing passage of fluid bodies through the ring in a direction radially thereof.

3. As an article of manufacture a piston ring comprising a plurality of circumferentially spaced-apart walls, resilient connecting portions for the walls, sealing elements mounted in the spaces between the walls, said sealing elements presenting projecting portions engaged in the said walls for the purpose of fixing the sealing elements therebetween.

4. As an article of manufacture a piston ring comprising a plurality of circumferentially spaced-apart walls, resilient connecting portions for the walls, T-shaped sealing elements mounted in the spaces between the walls, the legs of the said T-shaped sealing elements adapted to fill the spaces between the walls, and the heads of the T-shaped elements adapted to extend across inner peripheral edges of the walls throughout their axial height.

5. As an article of manufacture a piston ring comprising a plurality of walls circumferentially spaced apart and secured by alternately disposed top and bottom resilient connecting portions, said walls being formed with openings, sealing elements mounted between the walls and adapted to substantially fill the spaces therebetween, said sealing elements presenting locking portions adapted to engage in the openings in the walls for the purpose of fixing the sealing elements.

6. As an article of manufacture a piston ring comprising a plurality of walls circumferentially spaced apart, resilient connecting portions for the walls, said walls presenting depressions along the sides thereof, a plurality of sealing elements mounted between the walls, said sealing elements having relatively thick central portions engaged in the depressions in the said walls.

7. As an article of manufacture a piston ring comprising a strip of resilient piston ring material reversely bent upon itself and formed into an annular body made up of crowns and spaced-apart connecting portions, a plurality of blocks interposed between the web portions and adapted to substantially fill the spaces therebetween, said blocks including pins located along edges thereof adapted to engage through the crowns for the purpose of fixing the blocks between the web portions.

THOMAS A. BOWERS.